Patented Feb. 12, 1946

2,394,758

UNITED STATES PATENT OFFICE 2,394,758

HYGROSCOPIC SALT SOLUTIONS CONTAINING ARSENIC INHIBITORS

Alvin M. Edmunds, Midland, Mich., assignor to The Dow Chemical Company, Midland, Mich., a corporation of Michigan No Drawing. Application December 7, 1942, Serial No. 468,129

10 Claims. (Cl. 159—47)

This invention relates to a method for retarding the corrosion of ferrous metal surfaces by hygroscopic salt solutions. It also concerns hygroscopic salt solutions of reduced corrosiveness.

Concentrated solutions of hygroscopic salts, especially solutions of calcium and lithium halides, are adapted for use in a variety of industrial processes, such as the dehydration of moist gases. However, since most of these processes are carried out in steel apparatus, and since ordinary hygroscopic salt solutions sometimes tend seriously to attack ferrous metals, the use of such solutions occasionally gives rise to difficult operating problems, not only because the corrosive attack may shorten the useful life of the equipment but also because the products of corrosion may collect as solid deposits in the apparatus and impede the circulation of the hygroscopic solution.

A number of inhibitors for minimizing this corrosion have been suggested, but they are for the most part relatively ineffective, and often fail utterly when the hygroscopic solution is heated at temperatures above 200° F., in some cases even accelerating the rate of corrosion at these temperatures.

It has now been found, however, that the corrosion of ferrous metals by hygroscopic salt solutions may effectively be retarded, even at temperatures well above 200° F., by incorporating in the solution a small proportion of an arsenite.

The use of arsenites according to the invention is directed principally to retarding the corrosion of ferrous metal by hygroscopic solutions essentially comprising a halide of at least one of the metals calcium and lithium, and is particularly effective in the case of solutions containing a substantial proportion of a chloride or bromide of one or both of these elements. Typical hygroscopic solutions to which the invention has been successfully applied are strong calcium chloride brines, aqueous solutions of calcium chloride and glycerol, and aqueous solutions containing both calcium bromide and calcium chloride (U. S. Patent 2,033,934), and calcium bromide and lithium bromide (U. S. Patent 2,143,008). These latter solutions containing calcium bromide, especially those also containing lithium bromide, present peculiarly difficult corrosion problems, even among hygroscopic halide solutions in general, but are rendered satisfactorily non-corrosive in accordance with the present invention.

The arsenite inhibitor should, of course, be added to the hygroscopic solution in a concentration sufficient substantially to retard the corrosion of ferrous metals, a concentration corresponding to at least 0.002 parts of arsenious oxide ($As_2O_3$) per 100 parts of solution ordinarily being required. Larger quantities, e. g. 0.005 to 0.2 per cent, up to the solubility limit of the compound are most often used. Since many of the heavy metal arsenites are insoluble in certain hygroscopic solutions, the arsenites of the alkali- and alkaline-earth metals are preferably employed. An arsenite of sodium, such as that obtained by dissolving arsenic trioxide in a somewhat less than chemically equivalent quantity of sodium hydroxide solution, is particularly convenient. In general, this latter arsenite inhibitor remains dissolved in the hygroscopic solution to an extent amply sufficient to provide effective inhibition, even in the case of calcium halide-containing solutions from which precipitation of insoluble calcium arsenite might have been expected, provided the arsenite is added to the hygroscopic solution with vigorous agitation, and, if necessary, with simultaneous application of heat.

The concentration of arsenic inhibitor tends to decrease with time when freshly prepared solution is first used in new equipment so that under these conditions more inhibitor should be added from time to time to maintain a constant concentration until the loss ceases.

Arsenite-containing hygroscopic solutions according to the invention may satisfactorily be employed in any process to which hygroscopic solutions are ordinarily placed. They are particularly advantageous in cyclic processes for dehydrating moist acid-containing gases, such as wet sulfide-containing natural gas, in which the hygroscopic solution is first passed into contact with the gas to remove moisture therefrom, after which the resulting diluted solution is regenerated by heating at temperatures well above 200° F. to drive off water. In such processes as ordinarily carried out, the hygroscopic solution soon becomes acid by contact with the gases being dried, often attaining a pH value as low as 3 to 4. As a result, the corrosion normally caused by the electrolytic action of the hygroscopic solution is aggravated by acidic corrosion from the dissolved acid and in consequence attack of the apparatus occurs with extreme rapidity, rendering further operation practically impossible after a comparatively short time. However, with the arsenite-containing solutions of the invention, even under these extreme conditions corrosion is reduced to a very low value, and continuous trouble-free operation is possible over long periods of time.

The following examples will illustrate the invention:

Example 1

A weighed polished sample of mild steel was partially submerged for seven days in a hygroscopic salt solution exposed to the air and maintained at a temperature of 200° to 220° F., the solution consisting essentially of 45.4 parts by weight of calcium bromide and 8.59 parts of calcium chloride dissolved in 46 parts of water and having been adjusted to a pH value of 4.0 by addition of hydrochloric acid. At the end of the test, the sample, the surface of which was badly pitted, was cleaned of corrosion product and reweighed. The observed loss in weight referred to the submerged area of the steel sample corresponded to a corrosion rate of 0.664 pounds per square foot per year.

In another test run under identical conditions, except that the hygroscopic salt solution contained 0.5 per cent by weight of an arsenite of sodium inhibitor solution prepared by dissolving 4.0 parts of arsenic trioxide in a solution of 1.0 part of sodium hydroxide in 7.09 parts of water, the steel sample was apparently unchanged, and there was no observable loss in weight.

Example 2

The tests of Example 1 were repeated, with the exception that an atmosphere of natural gas containing hydrogen sulfide in a concentration of 2 grains per 100 cubic feet was maintained over the hygroscopic solutions during the tests. In this case, the corrosion rate of the steel sample submerged in the arsenite-containing hygroscopic solution was only 7.4 per cent as great as that of the sample exposed to the uninhibited solution.

Example 3

The tests of Example 1 were repeated with a hygroscopic solution consisting of 35.0 parts of calcium bromide, 9.85 parts of calcium chloride, and 26.5 parts of lithium bromide, the temperature being maintained at 300° F. The corrosion rate of the sample exposed to the solution containing 0.5 per cent by weight of sodium arsenite inhibitor was only 10.8 per cent of that exposed to the uninhibited solution.

While the trivalent arsenic compound inhibitor added to the hygroscopic salt solution according to the invention is most conveniently used as the sole inhibiting agent, it may, if desired, be admixed with other inhibiting substances, such as organic nitrogen bases, as described in detail in my earlier application Serial No. 398,117, filed June 14, 1941, of which this application is a continuation-in-part. However, with hygroscopic solutions containing both calcium bromide and lithium bromide, especially when these are used at temperatures above 200° F. in contact with acidic gases, it is highly preferable that an arsenite be used as the sole inhibiting agent, since many added substances retard the effectiveness thereof.

I claim:

1. As a composition of matter, a hygroscopic salt solution essentially comprising a halide of at least one of the metals calcium and lithium and having incorporated therein as an inhibitor for retarding corrosion of ferrous metals a small proportion of an arsenite.

2. A composition according to claim 1 wherein the arsenite is selected from the class consisting of the alkali- and alkaline-earth metal arsenites.

3. A composition according to claim 1 wherein the arsenite compound is an arsenite of sodium.

4. As a composition of matter, a hygroscopic salt solution essentially comprising calcium bromide and having dissolved therein as an inhibitor for retarding corrosion of ferrous metals a small proportion of a substance selected from the class consisting of the alkali- and alkaline-earth metal arsenites.

5. As a composition of matter, a hygroscopic salt solution essentially comprising a halide of at least one of the metals calcium and lithium and having incorporated therein as the sole inhibiting agent for retarding corrosion of ferrous metals a small portion of an arsenite.

6. As a composition of matter, a hygroscopic salt solution essentially comprising calcium bromide and lithium bromide and having dissolved therein as the sole inhibiting agent for retarding corrosion of ferrous metals a substance selected from the class consisting of the alkali- and alkaline-earth metal arsenites.

7. A composition according to claim 6 wherein the inhibiting agent is an arsenite of sodium.

8. In a process wherein a hygroscopic salt solution essentially comprising a halide of at least one of the metals calcium and lithium is circulated in contact with ferrous metal surfaces, the method of retarding corrosion of such surfaces by the solution which comprises incorporating in the solution a small proportion of an arsenite.

9. In a cyclic process of dehydrating moist acid-containing gas, during one step of which an acidic hygroscopic salt solution essentially comprising a halide of at least one of the metals calcium and lithium is heated at temperatures above 200° F. in contact with ferrous metal surfaces to drive off water from the solution,, the method of retarding corrosion of the said surfaces by the heated acidic solution which comprises maintaining dissolved in the solution a small proportion of a substance selected from the class consisting of the alkali- and alkaline-earth metal arsenites.

10. In a process of dehydrating moist acid-containing gas, during one step of which an acidic hygroscopic salt solution essentially comprising calcium bromide and lithium bromide is heated at temperatures above 200° F. in contact with ferrous metal surfaces to drive off water from the solution, the method of retarding corrosion of the said metal surfaces by the heated solution which comprises maintaining an arsenite of sodium dissolved in the solution as the sole inhibiting agent.

ALVIN M. EDMUNDS.